United States Patent [19]

Lemelson

[11] Patent Number: 4,675,498

[45] Date of Patent: Jun. 23, 1987

[54] APPARATUS AND METHOD FOR CODING OBJECTS

[76] Inventor: Jerome H. Lemelson, 48 Parkside Dr., Princeton, N.J. 08540

[21] Appl. No.: 686,908

[22] Filed: Dec. 27, 1984

Related U.S. Application Data

[63] Continuation of Ser. No. 968,216, Dec. 11, 1978, abandoned, and a continuation-in-part of Ser. No. 498,953, Aug. 20, 1974, Pat. No. 4,356,215, said Ser. No. 968,216, is a continuation of Ser. No. 667,255, Mar. 16, 1976, abandoned, which is a continuation of Ser. No. 506,887, Sep. 17, 1974, abandoned, which is a continuation-in-part of Ser. No. 157,574, Jun. 28, 1971, abandoned, which is a continuation-in-part of Ser. No. 665,526, Sep. 5, 1967, Pat. No. 3,587,856, which is a continuation-in-part of Ser. No. 215,210, Aug. 6, 1962, abandoned, said Ser. No. 498,953, is a continuation-in-part of Ser. No. 157,573, Jun. 28, 1971, abandoned.

[51] Int. Cl.[4] .............................................. B23K 26/00
[52] U.S. Cl. ...................... 219/121 LB; 219/121 LL; 219/121 LK; 219/121 LW; 219/121 LX; 346/76 L
[58] Field of Search ................. 219/121 LB, 121 LK, 219/121 LL, 121 LW, 121 LX; 209/111.5, 111.7, 111.8, 72 MSD; 250/559, 560, 561; 346/76 L; 178/15; 356/157, 158, 167, 168; 358/101, 107

[56] References Cited

U.S. PATENT DOCUMENTS

| 3,154,370 | 10/1964 | Johnson | 219/121 L |
| 3,154,371 | 10/1964 | Johnson | 219/121 L |
| 3,175,196 | 3/1965 | Lee, Jr. et al. | 346/76 L |
| 3,301,949 | 1/1967 | Ullery, Jr. | 358/101 |
| 3,325,819 | 6/1967 | Fraser | 346/76 L |
| 3,529,169 | 1/1970 | Heany et al. | 356/157 |
| 4,213,163 | 7/1980 | Lemelson | 360/35 |

Primary Examiner—Clifford C. Shaw

[57] ABSTRACT

An apparatus and method are provided for applying code recordings to objects, such as record members and the like, for computing, identifying, pricing, routing and other functional purposes such as those associated with record keeping, classifying, storage and controlled movement of such articles. In one form, a selected portion of a record member is detected by a sensing device which generates a signal which is applied to a code generating and control device which operates thereafter to control the operation of one or more radiation generators, such as laser or electron beam generating devices, in a manner to generate a series of energy pulses which are directed at the record member or object and serve to burn, discolor or otherwise record pulse codes along one or more tracks of the objects. The objects coded may comprise flat cards, envelopes, record strips, containers or otherwise shaped articles of manufacture. In a particular form, cards, other devices or coatings are attached to objects and are coded by automatic beam pulsing means for identifying such objects.

16 Claims, 9 Drawing Figures

APPARATUS AND METHOD FOR CODING OBJECTS

RELATED APPLICATIONS

This is a continuation of application Ser. No. 968,216 filed Dec. 11, 1978, abandoned, as a continuation of application Ser. No. 667,255 filed Mar. 16, 1976, abandoned, as a continuation of Ser. No. 506,887 filed Sept. 17, 1974, abandoned, and a continuation-in-part of Ser. No. 157,574 filed June 28, 1971, abandoned, a continuation-in-part of Ser. No. 665,526 filed Sept. 5, 1967, now U.S. Pat. No. 3,587,856, a continuation-in-part of Ser. No. 215,210, filed Aug. 6, 1962, also abandoned. This application is also a continuation-in-part of Ser. No. 498,953 filed Aug. 20, 1974, now U.S. Pat. No. 4,356,215 as a continuation-in-part of Ser. No. 157,573 filed June 28, 1971, for Record Member, Recording Apparatus and Method, now abandoned.

This invention relates to an apparatus and method for coding and reading objects such as cards, sheets, envelopes, boxes and otherwise shaped articles of manufacture for the purpose of identifying, keeping track of, routing and conveying same to selected destinations. Radiation beam generating and central means such as disclosed in my application Ser. No. 225,173 filed Aug. 27, 1962, now U.S. Pat. No. 4,213,163, may be employed for recording codes on objects and, in certain instances, for reading such codes. P A number of methods are known for the scanning and sorting of cards and pieces of mail for filing or distributing same and retrieving a selected unit. It is known, for example, to punch holes in a card and to drive said card through a scanning device including electrical contact or optical scanning means which is operative to generate one or more codes indicative of the identification of the card. Such punchings or cutouts are generally provided longitudinally along the face of the card and suffer a number of shortcomings. It is obvious that cutouts cannot be utilized for the coding or sorting of envelopes such as mail. Such coding and sorting is generally effected by printing alphanumeric characters or a train of numbers which are electro-optically scanned by a device reading the face of the envelope. In the latter arrangement, various shortcomings are also experienced, one of which includes the necessity of separating stacked envelopes and properly disposing same with respect to the reading device which generally comprises one or more banks of photomultiplier tubes or reading heads. Unless all characters are predeterminedly positioned on the face of the envelope, a condition which is generally very difficult to attain in an automatic sorting system applied to mail and the like, the reading device requires a relatively complex means for aligning its optical system or the envelope so as to permit reading the proper line of characters while ignoring other characters associated with other information on the face of the envelope. Another shortcoming includes, in addition to separating envelopes from a stack thereof, various problems involved in reading envelopes of different sizes, positioning envelopes so that the information bearing face is in the direction of the electro-optical scanning means, and assuring that the envelope is at the proper attitude at the location where typewritten characters are to be read.

Furthermore, conventional electro-optical character reading equipment is relatively complex and quite expensive to manufacture and use as it requires very sophisticated electrical logic circuitry.

It is, accordingly, a primary object of this invention to provide a new and improved record scanning system of simple structure and operation.

Another object is to provide a coding, sorting and scanning system applicable for the automatic distribution of record cards, pieces of mail and the like.

Another object is to provide an improved system for scanning and coding oblong, flat objects such as envelopes and cards which system includes means for coding and scanning an area along the edge or border of each member which is easily positioned to effect the scanning of said area without the need for relatively complex conveying and scanning apparatus.

Another object is to provide a new and improved apparatus for scanning coded cards and envelopes which is relatively inexpensive and simple to operate.

Another object is to provide a card and envelope scanning apparatus which does not require complex means for locating identifying codes and may be operated without the use of complex logic circuitry for determining said codes.

Another object is to provide an improved system for coding and sorting mail which is relatively inexpensive and uncomplicated.

Another object is to provide an improved method and apparatus for coding pieces of mail, such as envelopes and cards, by employing the force of gravity to align the lower edge of said mail with a coding means and also utilizing gravity for alignment during reading, thereby eliminating a substantial amount of equipment ordinarily needed for providing coded characters on the face of an envelope and thereafter aligning said envelope characters with a reading device.

Another object is to provide a new and improved apparatus and method for coding and routing packages, pallets and other objects having an alignable straight edge portion.

Another object is to provide an improved routing apparatus for articles such as mailpieces including means for applying for coding a coating, film or tape such as magnetic recording material to such articles.

Another object is to provide improved rotary means for applying variable series codes to stationary articles or articles moving therepast.

Another object is to provide a method and apparatus for coding articles in a manner to permit simple reading of the applied codes by the spray application of coding or codable material on predetermined areas of said articles.

Another object is to provide a method and apparatus for coding and identifying articles by recording codes on said articles with a modulated intense radiation beam such as a light beam generated by a laser operative to discolor or burn codes in the surface strata of the articles.

With the above and such other objects may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
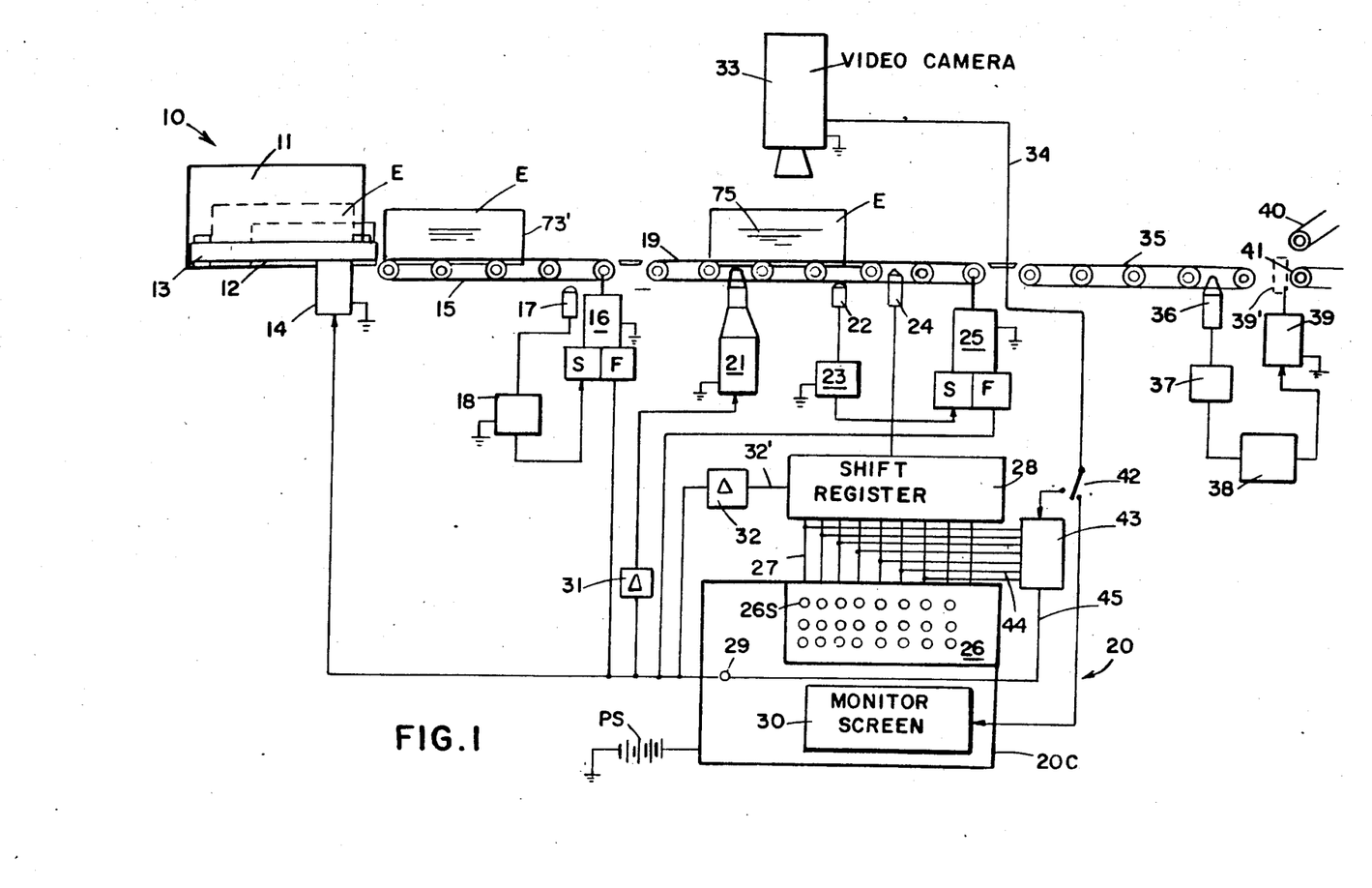
FIG. 1 is a schematic diagram illustrating an article coding, reading and routing system which is particularly applicable to the routing of mail pieces and information bearing cards.

In FIG. 1 is shown part of a system for automatically coding and routing articles such as envelope and card mail pieces. However, the system illustrated in FIG. 1 is also applicable to the coding and routing of packages by utilizing most of the scanning, coding and conveying techniques provided therein.

The coding and sorting or routing system 10 includes a first means 11 such as a feeding bin or other suitable storage means for a plurality of mail pieces or cards which are individually designated by the alphabetical character E. The pieces E to be coded and routed may be horizontally or vertically stacked within the bin or feed magazine 11 in accordance with known designs, one such magazine illustrated in U.S. Pat. No. 2,891,467 contains means for feeding individual mail pieces to an outflow conveyor. In FIG. 1, the mail pieces E are fed in a horizontal stack and the endmost piece is disposed against a power-driven conveyor belt 12 which, cooperates with a feed mechanism 12 which is driven together with the belt 13, by a controlled electric motor 14 which operates to feed individual mail pieces or cards intermittently onto a conveyor 15 leading to a conveyor 19 at the coding station 20. Conveyor 15, intermittently driven by a controlled electric motor 16, which like motor 14, is preferably a gear motor and has respective start and stop controls designated F and S which may comprise the inputs to a pulse operated bistable switch feeding electrical energy to the input of said motor. Motor 14 may be similarly operated, although in FIG. 1, it is illustrated as having a single control line input thereto for pulsing the motor control and comprising part of the unit 14, and such control is operative when so energized to cause the motor and the mechanism driven thereby to operate in a single cycle for releasing just one card or mail piece E from bin 11 to the conveyor 15 as provided, for example, in the Recordak 300 Stack-Reader for feeding cards to a reader.

Figure 2:
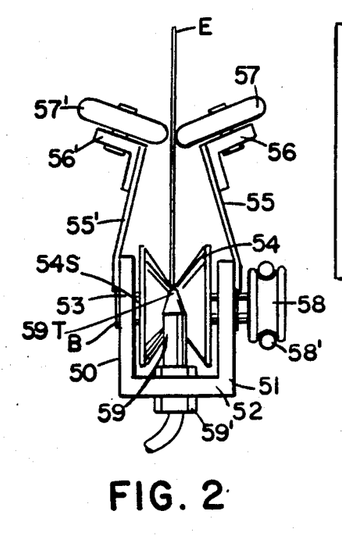
FIG. 2 is an end view of one type of conveyor for oblong flat articles of the type conveyed in FIG. 1.

The conveyor 15 is operative, as illustrated in greater detail in FIG. 2, to convey the lower edge 73 of a card or envelope along a predetermined path or line so that said lower edge will be properly disposed for applying a code recording or marking therealong such as on the border area adjacent said lower edge as will be hereafter described. Thus, regardless of the height and length of the envelope, all envelopes will contain a code sorting or destination recording along their lower edges or borders which may be easily read for sorting purposes by predeterminately positioning and conveying each piece with the lower edge thereof travelling the same path as the lower edges of all such pieces.

A photoelectric detector 17 is disposed immediately adjacent conveyor 15 and is operative to detect the leading edge 731 of a piece E travelling along conveyor 15. The photoelectric controller 18 for the cell or scanning system 17 is operative to generate an output pulse upon detecting such leading edge, which pulse is applied to the stop control S of motor 16 which temporarily stops conveyor 15 carrying the piece to be coded thereon while awaiting release of the piece downstream thereof which is being scanned and coded.

Monitor station 20 includes a monitor screen 30 which provides an enlarged image of the address 75 on the face of the card or envelope E when the latter is disposed in the scanning field of a television camera 33 having its picture signal output 34 connected to the video receiver containing the monitor screen 30. Thus the operator of the station may easily view the state and city destination printed or written as part of the address 75 of the card, permitting him to properly code the lower edge of the card.

The monitor station 20 includes a console 20C having, in addition to the monitor screen 30, a single pushbutton cycle control switch 29 and a panel 26 containing a plurality of pushbutton coding switches 26S. By properly depressing the banks of coding switches 26S, parallel destination codes are generated on the outputs 27 thereof which extend to a shift register 28 for converting the parallel codes to a series code which is held therein until an input 32′ to the shift register is energized after which the series code is applied to activate a recording device 24 which records the series code along the lower border or edge of the piece E.

Upon activating a cycle control switch 29, a control signal is generated on a plurality of circuits including a circuit extending to the control for the motor-operated device 14 for releasing the next piece from the bin 11, the start control F of motor 16 for driving the piece held upon conveyor 15 to conveyor 19, the start control F of motor 25 for driving conveyor 19 to remove the previously coded piece therefrom onto continuously driven conveyor 35 and a delay relay 32 in the line 32′ leading to the trigger input of the shift register 28. A delay in the operation of the shift register is thus provided to permit the leading edge of the piece E to be coded to be driven past the recording transducer 24. After recording is effected, the piece is transferred from conveyor 19 to conveyor 35 which extends to a plurality of branch conveyors, designated 40, 41, etc., onto one of which the piece is conveyed or transferred by means to be described.

Edge or border coding of each piece on the conveyor 19 may be effected in one of a number of manners depending upon the marking or recording system provided. In FIG. 1, an automatic, motor-operated applicator 21 for recording material has its output closely disposed to the path along which each piece is conveyed on conveyor 19 and is operated by a signal generated by a time delay relay 31, which is activated when the cycle start control switch 29 is activated. In other words, at some time after the piece E has started its movement towards conveyor 19 from conveyor 15, the applicator device 21 dispenses a recording material by spraying or rolling same along the lower edge or border of the mail piece as it passes said applicator. In one form of the invention, the recording material may comprise magnetic oxide which is roller or spray coated along said edge or border or is otherwise applied thereto as the piece is fed past the applicator on conveyor 19.

A photoelectric detector 22 detects the leading edge of the piece E and its control 23 generates a pulse output to the stop control S of motor 25 which predeterminately positions the piece in the scanning field of the video camera 33. The operator of the station 20 reads the address 75 on the face of the piece E and, either mentally or by reference to a chart, generates the necessary address or selection code by properly operating selected of the switches 26S on the control panel 26. Thereafter, the cycle is repeated when the operator depresses start cycle control switch 29 after which the recording transducer 24, which may comprise a magnetic recording head, is engaged or rolled against the edge or border of the piece E containing the recording material provided by device 21. The motor 25 is operated to remove the piece E from conveyor 19 to transfer it to conveyor 35 until the photoelectric detector 22 detects the leading edge of the next card whereupon motor 25 is stopped by pulsing the stop input S thereof.

The piece E may be stored downstream of conveyor 19 in the event that it is a card to be edge coded or, if it is a mail piece it may be conveyed on conveyor 35 past a magnetic reproduction transducer 36 which is operative to operably engage the magnetic recording material applied to the lower edge or border thereof and to reproduce the code provided as a recorded pulse train along such lower portion of the piece. The output of reproduction transducer 36 is passed to an amplifier 37 which generates a series code on its output, which output extends to a logical switching circuit controller 38 which controls a servo 39 operating a gate deflection means 39' for properly transferring the piece to one of a plurality of branch conveyors 40, 41, etc. for properly routing the piece E along that path which is indicated by the code provided on its lower edge and reproduced by reproduction transducer 36.

In FIG. 1, notation PS refers to a power supply for electrically powering the switches, controls and motor device 30 associated with the monitor and coding switch controller 20C for generating the described control and code signals on the outputs thereof. It is assumed that suitable power supplies are provided on the proper sides of all switches, controls and motors illustrated in FIG. 1, such not having been illustrated therein for the purpose of simplifying the drawings.

The recording material device 21 may be subject to a number of variations depending on the coding, recording and scanning apparatus used in the system. For example, device 21 may adhesively apply coded or uncoded tape, such as magnetic recording tape, along a selected band area such as near or parallel to the lower edge of member E. Printed or other optically scannable tapes or recording material may be applied by suitable roller applying means comprising part of device 21 which may also contain recording means for the code operatively connected to the code generating means described herein. Device 21 may also comprise a printing wheel for magnetic material or ink for applying machine readable characters or codes along the piece E as it is driven therepast. Device 21 or the transducer 22 may also comprise a laser and means for pulse modulating its output with code signals for burning a code along or parallel to the lower edge of members E or containers fed therepast.

It is also noted that reading device 36 may be a photoelectric reading system such as employing a light reflected off an electro-optically readable code applied by one of the means defined herein.

While the monitor and coding station 20 is provided with manual coding and envelope transfer control means in the form of the switches 26S and 29, it may also be operative in an automatic mode whereby the routing codes are generated by electro-optically scanning the address lines 75 printed on the mail pieces and generating a code by operating suitable character recognition means. In this connection, the video camera 33, or a suitable auxiliary electro-optical scanner, may be provided to scan the face of the mail piece containing the alpha-numeric representation of the address destination on lines 75 thereof and to generate a video picture signal output on line 34, which is passed to suitable computing circuits including character recognition means defined by notation 43. A switch 42 in the output line 34 of the video camera 33 may switch the video picture signal from the monitor screen 30 to the computer 43 in the event that, for example, all mail pieces E are provided with easily recognized characters, such as defining typewritten or printed addresses, which are predeterminately positioned along the face of the mail piece. Parallel outputs 44 of the computer 43 extend to the inputs to the shift register 28 for transferring a parallel destination code, as computed by the circuits of computer 43, or a single output may extend from 43 directly to the coding transducer 24. Another output 45 of the computer circuits 43 may extend directly to the output of switch 29 for effecting the described operational cycle. However, since the video camera or optical scanning device 33 operates at relatively high speed to scan the face of the mail piece, containing the address thereon, such scanning may be effected on-the-fly without the need to stop individual pieces in the scanning field of the camera, as described, and the apparatus and the camera may be operated in a manner to present mail pieces one behind the other and in constant motion of the described conveyors.

The automatic scanning means for identifying the document, envelope or package and/or determining its destination so as to provide a coded electrical signal for controlling recording as described, may comprise a conventional electro-optical character reader is adapted to read all lines of the address or label 75 and, by logical circuit or other means, determines the destination and-/or other characteristics of the document for coding purposes. In a preferred form, means may be provided for the reader to read just the last line of characters and preferably the last portion 75Z thereof which may comprise the zip code. Suitable optical scanning means may be provided, such as an electron beam scanning means to scan laterally from or near the bottom edge of the envelope upwardly until the last line of characters is identified and is operable to generate a pulse output upon detecting such last line to control the positioning of the line scanning means so as to scan said last line only. If the envelope is fed lateral to its longitudinal edge 73 such as edge by means provided in my U.S. Pat. No. 3,309,669, then the activation of any one of a plurality of photoelectric detectors, scanning the face of the envelope and disposed in a line parallel to edge 73, may generate a control signal when the last line 75Z of characters is scanned. Such control signal may be employed to stop the means driving the envelope and initiate the operation of the scanning disc or beam to cause it to scan such last line which may comprise characters defining the town and city or maybe the mail zip code per se. If such last line is defined by the zip code signals, the code output by the scanner may be a series of binary codes indicative of the zip code which may be recorded, as described, along the recording area of the envelope or may be electronically converted to a single binary series code indicative of the zip code number prior to applying same to modulate the recording transducer. A suitable time delay relay may be employed to initiate the motor driving the envelope from the reader onto, for example, a conveyor of the type described such as edge travelling conveyor 35.

If an electron beam scanning means is operable to read the zip code 75Z, suitable logical switching circuitry may be provided to detect the last line or zip code portion of the address 75 and cause the read beam of the scanning means to read such last line or zip code or control a gate to pass the modulated analog signal output generated when the read beam thereof scan said last line of characters or code to a suitable means for converting such analog signal to a suitable signal form which may be used to modulate and control the described magnetic or optical recording means. If the zip code comprises the last line of printed matter it may be read per se and the resulting signals may be applied to the recording transducer. If such zip code is but part of the last line, of the address being read, beam scanning may be effected which initiates at the end of the line containing such code until the gap is detected between the zip code and end of the the printing defining the address portion of the last line, which scanning may be used to generate signals defining such zip code number.

Thus, it is seen that the apparatus defined in FIG. 1 may be operated either by a person viewing individual mail pieces when such mail pieces contain a variety of addresses in printed or handwritten form and disposed at various and locations or may be automatically effected if the mail pieces and their printed addresses are capable of being electro-optical scanned. Switch 42 in the output line 34, may be manually operated to define either automatic or manual operation of the scanning and coding operation.

The automatic scanning system defined by scanner 33 and computing circuitry 43 may be operated in accordance with known address scanning and recognition equipment or that provided in my parent application Ser. No. 622,650 which provides a rotating disc for reading a select line of a document driven past the scanner or by moving the scanner past the document.

FIG. 2 illustrates a conveyor for edgewise conveying thin oblong members E, such as cards and envelopes, to be coded. The features shown in FIG. 2 may be applied to any or all of the conveyors 15, 19 and 35 of FIG. 1. The oblong card or mail piece E is disposed in a channel-like guideway defined by longitudinally aligned conveyor wheels 54 having outer surfaces which taper sharply inwardly as illustrated to provide V-shaped wells for the cards or envelopes resting on the upper surfaces thereof. A plurality of longitudinally aligned wheels 54 are rotationally supported in spaced-apart relationship by a channel-like member 50 the side walls 51 and 53 of which contain ball bearings B which rotationally support the shafts 54S of the wheels 54.

The single concave, wedge shaped roller 54 of FIG. 2 may also be replaced or supplemented by a plurality of cylindrical rollers disposed with their peripheral surfaces properly angled to the horizontal with alternate rollers of an array of said rollers angled and power rotated to provide the same lower edge aligning, guiding and driving effect as the single rollers 54 illustrated in FIG. 2.

Other conveying means may also be provided to predeterminately align and guide the lower longitudinal edges of each envelope or card along a predetermined path for coding and reading same as described. For example, the horizontally angled surfaces defined by the inwardly tapering conical portions of the rollers 54 of FIG. 2 may be replaced by a pair of power driven flexible belts each angled upwardly and driven in the same direction at the same speed with their lower edges disposed close to each other or they may be disposed wherein the lower edge of one abuts the upper surface of the other so as, to provide a guideway for the lower edge or each mailpiece. A single belt or pulley or resilient material, folded or having a W-shaped upper surface may also be utilized.

In the embodiment of FIG. 2, it is noted that said wheel shaft 54 extends outwardly through the bearings from the wall 51 and contains pulleys 58 on the ends thereof which are rotated by a chain or belt 58' driven by a pulley or sprocket on the shaft of motor 16 so that all wheels 54 rotate simultaneously to drive the piece E therealong.

Cantileverly supported on the sidewalls 51 and 53 of the channel 50 and extending upwardly therefrom are a plurality of pairs of leaf spring members designated 55 and 55' each of which supports a pillow block denoted 56 and 56' which rotationally support respective wheels 57 and 57', the peripheries of which are spaced apart a degree greater than the thickness of the average piece E, although less than the thickness of the heaviest gauge or thickest mail piece. Thus, while some degree of lateral movement of the mail piece E may be effected between the rollers 57 and 57' such mail piece will be guided thereby and, if said wheels are power rotated by means such as that rotating the wheels 54, further means will be provided for powerdriving the member E along its guided path.

Since the lower edge of all pieces E is determined by the path defined by the low point of the radial groove or recess formed in the wheels 54, various devices such as the described magnetic recording and reproduction transducers, recording material application means and edge detection means may be provided between adjacent wheels 54 as illustrated in FIG. 2 where in a recording device 59 is supported by the bottom wall 52 of the channel 50 and is removably secured thereto by means of adjusting nuts 59' which retain same in a hole extending vertically through the bottom wall 52. If the exterior wall of member 59 is threaded, the transducer 59T which is secured thereby may be vertically adjusted and held by adjusting and tightening such adjustment nuts 59' against the wall 52 of the channel. The transducer head 59T illustrated in FIG. 2 is operative to scan or record signals along the lower edge of the piece E although it may be so shaped to scan or record along either or both the border areas of E. Similarly, the transducer, photoelectric detector or recording material application means may be adjustably supported by either or both side walls 51 and 53 of the channel 50.

Figure 3:
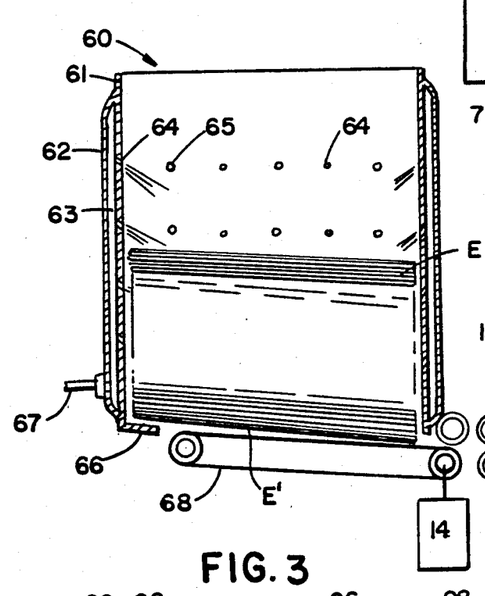
FIG. 3 is a side view with parts broken away for clarity of a modified form of the feed and conveying means of FIG. 1.

FIG. 3 shows details of a modified form of feeding bin 60 operable for individually feeding mail pieces or cards to a conveyor extending to a monitor and coding station as described. Whereas in FIG. 1 the feeding bin 11 is operative to stack the mail pieces or cards E so that they may be fed from a stacked arrayed such therefrom, the bin contain cards disposed in horizontal stack or at an angle to the horizontal for coding with the cards disposed as in FIG. 1 lying on their sides. The feeding means 60 of FIG. 3 includes a bin 61, the side walls of which are preferably made of tubed metal sheet containing a plurality of tube formations 62, each with a passageway 63 interconnected with the passageways of the other tube formations for feeding pressurized air from an inlet 67 through a plurality of holes 64 which are angularly drilled in the walls of when gas pressurizing bin 61 so as to direct a plurality of air streams against the uppermost piece of a stack of mail pieces to force said stack against the lower or far end wall 66 of the bin so that the lowermost piece E' is directed against a controlled belt conveyor 68 driven by motor 14. Thus, whenever motor 14 is energized for a predetermined period of time, piece E' will be carried thereby between the power operated conveyor belts 69 and 70 which a conveyor 15' corresponding to the first output conveyor 15 of FIG. 1. Notation 71 refers to a deflection plate for aligning and guiding one edge of each mail piece fed to the conveyor 15. Each piece E' may be forced by gravity or by means of wheels (not shown) riding thereagainst to contact the plate 71 as it is driven onto the conveyor 15' to align the edges of all pieces thereagainst to permit coding to be effected as described. From conveyor 15' the pieces are fed to a conveyor 19' corresponding to conveyor 19 of FIG. 1 and comprising a pair of power-driven endless belts 72 and 72' between which the aligned piece E is driven. Disposed adjacent the edges of belts 72 and 72' are devices 21', 22' and 24' corresponding in function to the recording material applicator 21, the photoelectric detector 22 and the recording transducer 24 of FIG. 1, each of which is so mounted to align its output with the edge or border of the card driven therepast as the conveyor 19' operates. The conveyors 68, 15' and 19' are intermittently and sequentially operated as described in the description on the apparatus of FIG. 1.

In FIG. 3, notation 65 refers to holes provided in sidewalls of the bin 61 operable for laterally exhausting air downwardly through from bin against the stack of mail pieces or cards through the holes 64.

Figure 4:
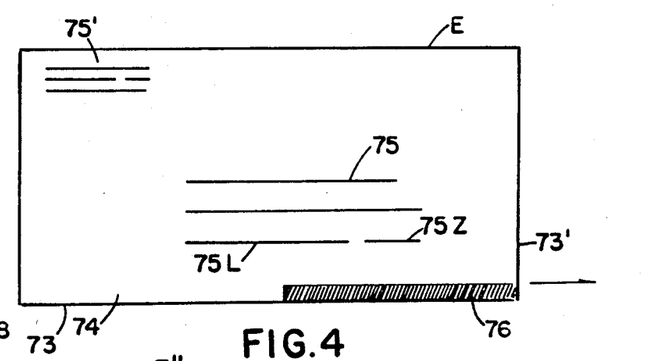
FIG. 4 is a side view of one form of piece conveyed by the apparatus of FIGS. 1–3.
Figure 5:
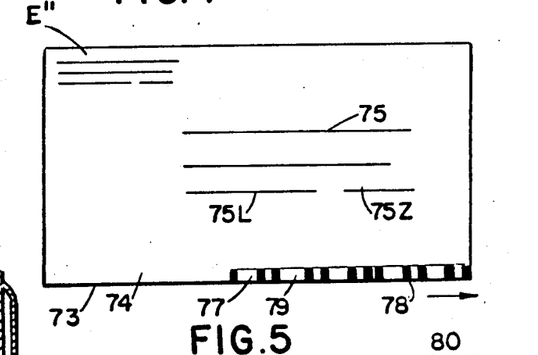
FIG. 5 is a side view of another form of piece conveyed by the apparatus of FIGS. 1–3.

FIGS. 4 and 5 illustrate mail piece or card structures employing different types of recordings along the edge or border portions thereof. In FIG. 4, the piece E is illustrated as an envelope or card having multiple address lines 75 containing written or printed name and destination characters and return address lines 75' disposed near the upper left hand corner thereof. Disposed adjacent to the lower edge 73 of the piece E along the margin or border portion 74 thereof, is a strip, tape or coating of magnetic recording material which may be applied thereto when the card or envelope is first fabricated, when it is addressed or by the means provided in FIG. 1 which may comprise a spray nozzle, roller coating wheel or applicator for a short length of magnetic tape; the magnetic recording material being generally defined by the notation 76 and illustrated as extending from the leading edge 73' of the piece E a sufficient distance along the lower marginal border 74 to permit the longest serial code to be recorded thereon.

In FIG. 5 is shown an elongated record member 75, such as an envelope or card containing address lines 75 of characters on one face thereof and a code 77 in the form of a plurality of spaced-apart, optically scannable marks 78 of predetermined height and separated by non-marked spaces 79 which, when scanned, also define a portion of the printed code. The marks 78 printed along the border portion 74 of the piece E" of FIG. 5, may be provided along the lower margin and/or across the lower edge 73 thereof by one or more selective recording means including a selectively operable array of rotary mark printing devices, such as selectively projectable and retractable printing cuts disposed at the ends of the spokes of a wheel, the periphery of which rides against the edge 73 or border portion 74 of the member to be coated. The marks 78 may also be applied in the form of a code by the selective pulsing of a solenoid which projects a printing cut or wheel against the record member and away from such lower edge or border 73 or by the selective operation of a valve disposed in the inlet of a small spray nozzle operative to spray apply printing ink or magnetic recording material to selected areas of the members E" such as the areas defined by marks 78. The recording transducer may also include (c) a variable mask which is operated by bi-stable solenoids connected directly to the outputs 27 of the pushbutton panel 26 which mask may receive mark printing material from a spray head or roller coating means applies thereagainst to provide the necessary coded array or marks; (d) a modulated intense radiation beam generating means such as an electron gun or laser generating an intense beam employed to either burn select portions of the border or margin 74 of the envelope or select portions of a recording material such as 76 so disposed to provide the necessary scannable code recording. The latter described beam recording means may be controlled, for example, by the series code signal generated by shift register 28 of FIG. 1 to provide a series code which is optically scannable.

Figure 6:
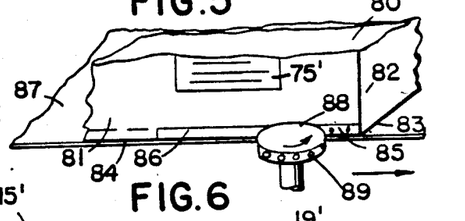
FIG. 6 is a fragmentary view of another form of piece which may be coded and conveyed by apparatus of the type described.

The coding and sorting apparatus hereinabove described and illustrated in the accompanying drawings may be modified to code and sort articles of manufacture, such as boxes or containers of rectangular configuration or a configuration having at least one straight edge which may be predeterminately disposed as described with respect to both the code marking or recording means and the code scanning or reproduction means. In FIG. 6, is shown a container 80 of rectangular configuration having a side wall 81 preferably, although not necessarily, containing an address label 75'. The container 80 may comprise, for example, a boxed mail piece, product container or pallet. Means, such as illustrated in application Ser. No. 468,418, may be provided for conveying the container 80 with its lower surface 83 disposed against a flight conveyor and the side wall 81 extending a predetermined vertical plane so that the edge defined by the intersection of walls 81 and 83 will travel a predetermined lineal path. By such means, all containers having rectangular parallelepiped configurations, regardless of the height, width and depth of said containers, may be so conveyed that the lower edge of each container may travel the same line path, thus predeterminately positioning the lower borders of each container with respect to a stationary coating or marking means. Such coating or marking means may comprise any the described magnetic recording, printing, spray applying or modulated beam burning means. In FIG. 6 is shown a wheel 88 which is rotationally supported at the side of the belt conveyor 87 carrying the container 80 and positioned such that the periphery of such wheel rides against a band-like portion 85 of the side wall 81 of the container adjacent the lower edge 84 thereof. Radially movable within the wheel 88 are a plurality of printing cuts or mark applicating devices 89, each of which is operated by a separate bi-stable solenoid disposed within the wheel. Each of such solenoids is operatively connected to a respective of the outputs 27 of the bank of code switches 26S of FIG. 1, so that the printing cuts may be selectively projected and retracted to apply marks in a coded array along the recording area 86 of the border 85 as the wheel 88 is rotated and either moves longitudinally along the wall of the container or rotates as the container is conveyed therepast.

Located downstream of the code applying wheel 88 is provided a magnetic or optical scanning transducer supports closely adjacent the conveyor 87 and operable to scan a series or parallel code applied to the margin 85 adjacent edge 84 of the container 80. The output of such transducer may be connected to means for transferring the container 80 to a selected of a plurality of branch conveyors, such as the means provided in FIG. 1 for routing envelopes or cards. The code wheel 88 of FIG. 6 may be replaced by a code modulated radiation beam generating means of the type described which is operative to discolor or burn portions of the container wall or a recording material 86 disposed adjacent the edge 84 of the container.

Figure 7:
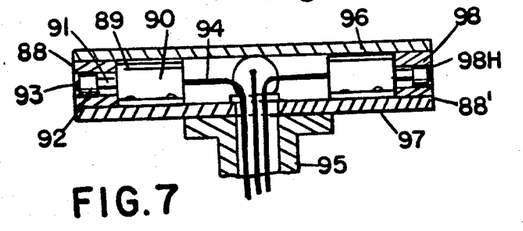
FIG. 7 is a side view with parts broken away for clarity of a portion of a wheel-device operative for recording series codes along a band area of a card, envelope, box, tape or other article.

Further details of the code applying wheel 88 of FIG. 6 are illustrated in FIG. 7. The printing wheel 88 comprises a disc-shaped hollow housing having upper and lower disc shaped walls 96 and 97 separated by a spacer ring 98 having a plurality of holes 98H extending radially therethrough. The printing devices 89 comprise a plurality of bi-stable solenoids 90 which are mounted on the bottom plate 97 inwardly of the ring 98 and have their shafts 91 extending radially to holes 98H. Secured to each shaft 91 of each solenoid 90 is a retainer 92 for a printing cut 93, which printing material may be retracted so that its outermost surface is below the peripheral surface 88' of the wheel 88 when the solenoid 90 is retracted in one of its two bi-stable states. When the solenoid is pulsed or switched to its other bi-stable state, the printing cut 93 protrudes outwardly from the peripheral surface 88' of the wheel 88 and provides means for applying a code mark to a surface against which the peripheral surface 88' of the wheel is rolled. Each of the solenoids 90 has an input wire pair 94 extending radially inwardly and along the interior of a hollow shaft 95 on which the wheel is mounted, said shaft extending to a drive means such as a rotary solenoid or motor which power rotates such wheel against a surface, such as any of the band areas 76, 78 or 86 of an envelope, card or container such as shown in FIGS. 4, 5 and 6. The wires 94 may extend to an array of commutator and brush elements located on the shaft 95 or directly to respective code signal generating output means such as the outputs 27 of the binary code generating pushbutton switches 26S of the bank 26 illustrated in FIG. 1. The solenoid energizing lines 94 may be connected to a computer or the circuits of the hereinabove described means for automatically reading the alphanumeric address 75 on the envelope or card or other means identifying the article being coded. If the rotary solenoid is coupled to shaft 95 so as to rotate the wheel 88, it may be activated, for example, by the signal generated on the output of delay relay 31 or a means such as the photoelectric scanner 22 which is operative for detecting the leading edge of the card, assuming that the conveyor along which the card is driven is operated thereafter for a sufficient time interval to permit the wheel 88 to effect a cycle of rotation against the member being coded. In an alternate form of the invention, the wheel 88 may be translated and rotated relative to the envelope, card or container while the latter is held stationary during a coding cycle.

The printing cut 93 located at the end of the solenoid shaft may comprise a self-inking printing cut or other suitable material which either contains its own ink supply or is fed a supply of ink from a source located within the retainer 92, shaft 91 or the housing of the solenoid 90. A suitable material which contains sufficient ink to provide thousands of printed impressions is a microporous plastic containing ink or magnetic recording material in the cells thereof. U.S. Pat. No. 2,777,824 describes a flexible plastic material which may be formulated to encapsulate a variety of liquids such as inks which may be dispensed upon compression of the material against the surface and such material may be utilized for the printing material 93 of FIG. 7.

It is noted that any suitable fast-drying printing ink or magnetic recording ink or magnetic recording ink may be dispensed from the periphery of the wheel 88 along the edge or border area of a card, mail piece, or container as described herein and illustrated in FIGS. 4 to 6. The solenoids 90 may also be of the mono-stable type whereby electrical energy applied to selected of such solenoids, will be operative to project the printing devices of each solenoid outwardly from the peripheral surface 88' of the wheel a suitable degree to permit spot marks to be printed on a flat mail piece or container in a coded array, as described, depending on which of those solenoids are energized.

The arrangement illustrated in FIG. 7 may also be operative to magnetically record a code on a strip of magnetic recording material such as 76 of FIG. 4 by replacing the printing material 93 with a magnet which, when the shaft 91 of the solenoid is projected, moves such magnet so that it will orient or disorient the magnetic domains of the magnetic recording material as the peripheral surface 88' of the wheel is rolled thereagainst or will not so affect such recording materials when retracted into the openings 98H.

Further improvements to the described and illustrated apparatus may include the following. The freewheeling wheels 57 and 57' of FIG. 2 may be replaced by a plurality of opposed jets of air operative to support the mail piece E in a substantially vertical attitude as it is driven along the wheels 54 or to drive or assist in the driving of said mail piece therealong.

The wheels 57 and 57' of FIG. 2 may also be replaced by a plurality of endless, power-operated belts which are mounted on pivotted and spring-loaded arms equivalent to the cantilevered spring members 55 and 55' of FIG. 2 for driving the mail piece E therebetween.

In FIG. 3 if the mail pieces E are fed vertically in horizontal attitudes in the bin 61 as illustrated in FIG. 3, they may be upended to attain the vertical position illustrated in FIG. 2 after they are fed onto the conveyor 68 by suitably designing conveyor 15' to receive single mail pieces from 68 and eventually guide same to a vertical attitude. This may be effected by providing suitable pulleys and guides for the belts 69 and 70 to direct such belts from a substantially horizontal attitude at the end of the conveyor which received pieces from conveyor 68 to a substantially vertical attitude at or near the end thereof so that the envelopes or cards may be fed vertically along conveyor 19 to preposition their lower edges and permit coding and reading as described. Accordingly, conveyor 15' may be used to upend and feed envelopes and cards to an aligned array of powered conveying wheels such as 54 either with the lower edge of each piece aligned with the bottom of the wheel indentation or smallest diameter or at different heights thereabove so that gravity may be utilized to cause the pieces to drop into the center of the receiving wheels to align the lower edges of said mailpieces. Depending on the maximum thickness of pieces to be conveyed, the slopes of the sidewalls of the depression in the wheels 54 may be greater or less than that illustrated. In fact, by providing wheels 54 with very steep wall portions and sufficient difference between maximum and minimum diameters, the support means for the upper walls of the envelopes or cards may be eliminated whereby each mailpiece is supported in a vertical or near vertical attitude, as it is driven or conveyed, by the wheels per se.

Stationery intense radiation beam means such as a modulated light beam generated by a laser, an electron beam or other suitable beam generated by means, such as described in my U.S. Pat. No. 4,213,163, and fixedly mounted with respect to the described conveyors may be used for recording and/or reading codes disposed along or parallel to the lower edge of each mailpiece or carton as the piece is driven therepast. Writing or recording codes or characters along said recording area may be effected by modulating the beam intensity to (a) burn and discolor the material such as paper comprising the piece, (b) discoloring or sensitizing a material applied as a spray or roller coating thereon, (c) discoloring or sensitizing a recording material applied as a tape which has been disposed along a predetermined band area of the piece as described, (d) demagnetizing by heat selected areas of a domain oriented magnetic recording material applied as a tape or coating rolled or sprayed onto the selected area of the piece, (e) burning one or more holes completely through the card, envelope or article fed past the beam generating means to permit light to pass therethru for optical reading purposes or to permit switch contact means or switch arm moving means to become activated as the piece passes the reading station, (f) burning selected areas of an opaque coating material such as a polymer disposed as a film over a reflecting material or a metal tape or film applied to the recording area of the piece to permit electro-optical or electrical reading means to read said uncovered areas by fixed transducers or scanners operative to scan said piece as it is driven therepast, (g) burning selected areas from an opaque coating in the form of a code or character area array and thereby uncovering a reflex reflecting material disposed beneath such opaque coating to permit electro-optical reading by photoelectric cell means receiving light from a light beam directed against said uncovered reflex reflecting material, (h) burning away selected desensitizing selected areas of luminescent material which is roller printed, spray applied or otherwise provided on the face of the piece, such as on one or more postage stamps. With respect to the latter described means for recording destination codes, it is noted that postage stamps or lables may be affixed to the surface of the piece which may have luminescent or sensitized material coating the entire area thereof as a printing ink or applied along a border thereof and operative to be burned off or desensitized as a series or parallel bit code along spot areas thereof by the described intense recording radiation beam.

Figures 8, 9:
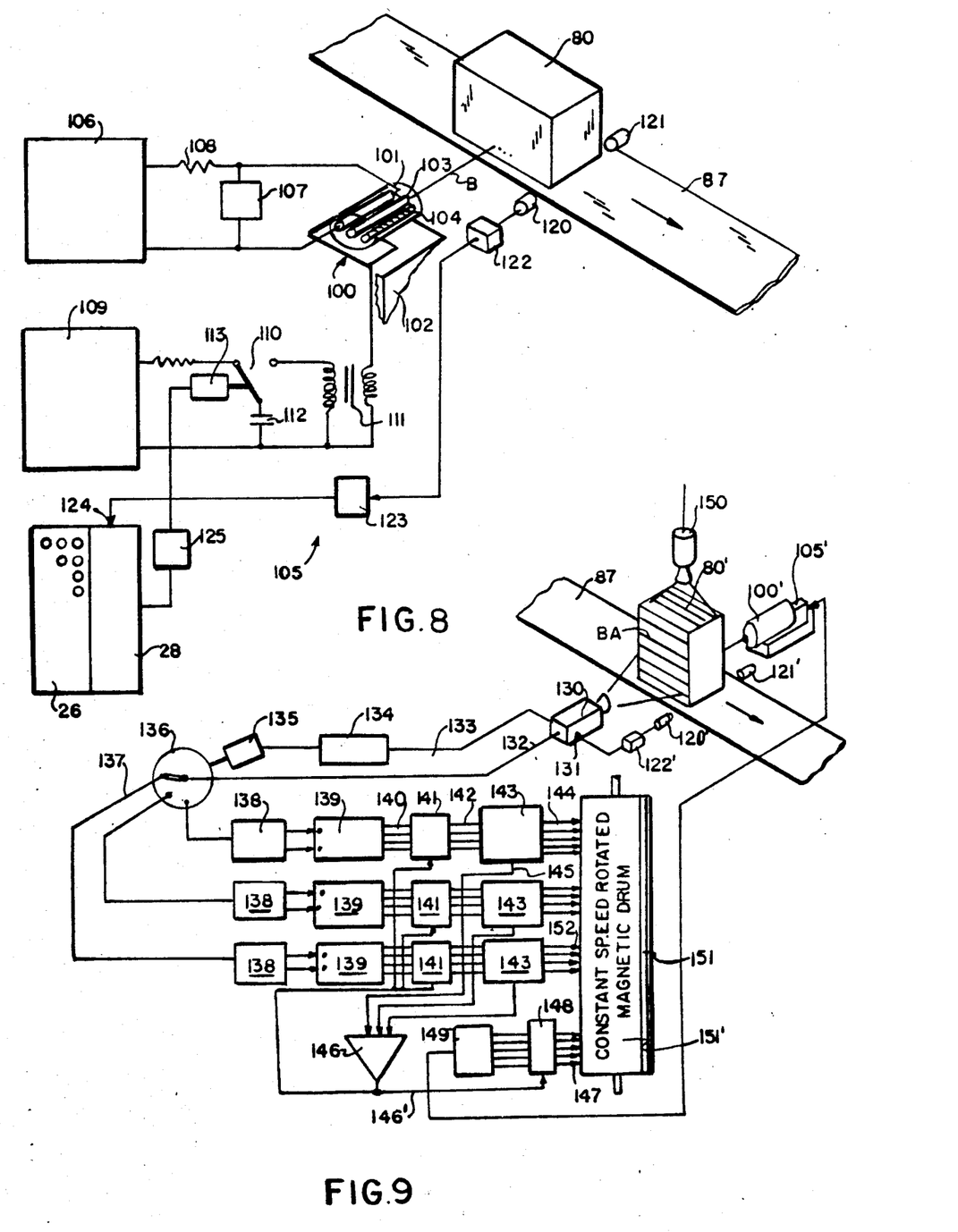
FIG. 8 shows one form of circuitry for controlling the recoding of a code on a moving object.
FIG. 9 shows an apparatus for indentifying and coding articles moving on a conveyor.

There is shown in FIG. 8 one form of circuitry for controlling the recording of a code defined by pulses of intense radiant energy generated by a laser directed at a moving object, such as a mail piece, product container or work in process disposed on a conveyor. In FIG. 8, the object is illustrated as a rectangular shaped container 80, which is adapted to move on a powered belt conveyor 87 past a laser 100 which is supported within a housing 101 disposed immediately adjacent the conveyor 87 on a mount 102 and directed to permit the pulsed beam B thereof to intersect all containers or work pieces at a predetermined distance above the conveyor so that if the work pieces are all properly aligned on the conveyor, each will have a code burned or otherwise provided in its surface predetermined distance from the edge or surface thereof disposed against the conveyor.

The laser 100 is shown as a solid-medium laser containing a ruby rod 103 surrounded by a flash tube 104 which is pulsed by energy fed thereto so as to pump the laser and cause it to generate a pulsed output. Other forms of lasers may also be provided, such as a so called $CO_2$ laser, which may be modulated or pulsed in its operation by means similar to that illustrated in FIG. 8 or by other simple means operable in response to a series of control signals defining the code information to be recorded on the container or object on the conveyor. In other words, the circuitry illustrated in FIG. 8 is only suggestive of one form of the invention wherein the heat generated by each light pulse of the laser my be operative to discolor or bore cavities in the surface of the container or work, or to discolor, cavitate or otherwise effect a pulse code recording therein.

The control circuitry 105 includes a variable high voltage power supply 106, such as a half-wave power supply fed by a 110-volt, 60-cycle alternating current which converts said current to a pulsating direct current of high voltage applied to charge a bank 107 of capacitors which store electrical energy through a resistor 108. As illustrated, the flash tube 103 is connected across the terminals of the capacitor bank 107 and is applied to fire the laser for generating a pulse of intense light energy when a trigger switch 110 is closed. The trigger switch 110 is connectable in series with a transformer 111 and a power supply 109. When switch 110 is in its closed or energized position, voltage from powersupply 109 connects the capacitor 112 across the primary of the transformer 111 which develops a high voltage pulse across the secondary of the transformer which is fed to the xenon flash tube 103 causing the gas thereof to become conductive and firing the flash tube which irradiates the laser rod with a brilliant flash of visible light causing the laser to emit a high energy pulse of light which is directed at the article or object 80 moving along the conveyer 87.

Depending upon the parameturs of the firing circuitry and the frequency at which the switch 110 is closed, a series of pulses may be generated on the output of the laser 100 and directed at the object 80 moving along the conveyor so as to record a series pulse code on or within the surface stratum thereof by burning, discoloring or sensitizing the material thereof along a band area a predetermined distance above conveyor 87.

The trigger switch 110 is shown as being operated by means of a monostable solenoid 113, which may be pulsed to close the switch momentarily each time it receives a control signal. The control signals fed to operate the solenoid 113 may be generated, for example, by the means illustrated in FIG. 1 (e.g. by the signals generated on the output of parallel-to-series convertor or shift register 28 set up in a manual switching bank, such as a keyboard or other suitable means, such as the signals generated in selectively reading recordings from a memory.

The means of FIG. 8, which is operable to cause the shift register 28 to generate the series code signal held therein, comprises a photoelectric cell 120 scanning across conveyor 87 and receiving light from a light source 121 disposed at the opposite side of the conveyor. When the object or article 80 on the conveyor 87, intercepts and blocks light from light source 121, the photo electric controller 122, which is connected to the photo-electric cell 120, generates an output signal which is passed through a delay relay 123 which is connected to the trigger or readout control input 124 of the code generating device 28. The output of code generator 28 is connected an amplifier 125 which generates pulses of sufficient intensity to energize solenoid 113 and momentarily closes switch 110 to pulse the laser 100. As stated, means other than the circuitry illustrated in FIG. 8 may be utilized for pulse-modulating a laser which is operative to scan the surface of a container, unit of work in process or other object moving along a conveyor for coding same as described.

While the code to be recorded on the object is initially generated by means of a keyboard 26 as described, it may also be generated from signal derived from recordings in a memory such as a core memory, magnetic drum, relay storage banks or other form of memory as selectively reproduced therefrom in response to control signals generated in detecting and identifying and object comprising one of a plurality of different objects passing the coding station. The keyboard may also be wired to permit it to effect the selection of code recordings from a memory by manually closing a particular switch or key closure.

For example, the rotating disc electro-optical reading and character identification means provided in my patents U.S. Pat. Nos. 3,309,689 and 3,555,246, may be modified to read characters on an article such as a mailpiece to generate digital signals representative of the characters read, such as the town and state or zip code and to present said digital signals to a computer having comparator means and to thereby effect the generation of a code such as a binary digital pulse code, which is applicable, for example, to gate a laser on and off a number of times, as in FIG. 8, so as to effect the recording by the beam thereof of a series code or codes along a band area of the object as the object is conveyed past the laser.

Various other means may also be employed including electron beam scanning such as by means of a flying spot scanner for scanning the face of an envelope or container of mail having an address thereon and generating code signals representative of the destination or address printed on the face thereof. These signals may be applied to a computer containing a memory of all destinations in code form and a comparator means for comparing the mailpiece generated signals with the codes of the computer memory. The comparator is operable to effect the generation of a code which is then applied to operate the laser to effect the recording of marks, cavities or holes along a band area of the side wall or along an edge of the mailpiece, as it is conveyed past the laser as described. The need to record the signals generated in scanning the alpha-numeric characters and representative of the address on the mailpiece in a memory, may be eliminated if the scanner is operable to scan so called zip codes printed as numerical characters on the mailpieces. The digitized results (are binary code signals) defining the zip code and may be applied to directly modulate or gate the laser beam on and off as the object is conveyed therepast so as to provide the described code along a band of the side wall of the object.

By applying an easily readable code, such as in the form of a series of properly spaced marks, holes or other form of recording, as above described, to a predetermined band area of a mailpiece, the first time the mailpiece is automatically scanned a routing system may be provided wherein equipment required for scanning and routing is greatly simplified. It is noted that the described means for digitizing the signals derived from reading an address on an envelope or mailpiece of any shape which define a code representing the address may define a relatively complex computing operation requiring complex and costly equipment to effect both the digitizing and comparison and to properly position the reading means with respect to the printed address or zip code which may vary in location from mailpiece to mailpiece. Accordingly, if the proposed single scanning, identifying and coding means is applied to provide a code to the mailpiece as described, subsequently used scanning equipment may be substantially simplified as it may only comprise simple photoelectric detectors or magnetic transducers for reading the simple codes applied to predetermined areas of each mailpiece as before described.

Modified forms of the apparatus herein described may be utilized to identify and code or merely identify objects on a moving conveyor, such as articles of manufacture, work-in-process, containers of products, material or work-in-process, etc. FIG. 9 shows an apparatus for identifying and coding articles on a conveyor past a scanning station containing one or more scanning devices, such as flying spot scanners 130 and 150 or modified TV cameras. Identification is effected by suitably beam scanning one or more dimensions of the object as it passes or is stopped at the scanning station and generating code signals which are representative of the dimension or dimensions scanned, then comparing such signals with signals recorded in a memory representative of all the objects expected to pass the scanning station and, when a match of the signals generated is effected, generating a code which is representative of the identification of the object. The code, so generated by the identifying means, may be recorded in a memory for auditing or inventory purposes, may be applied to operate routing apparatus disposed along the path of travel of the objects. Such codes may be recorded in a magnetic recorder, printer or laser recording means.

The flying spot scanner 130 of FIG.9 is operable to scan one or more band areas BA of the side wall of the objects 80' as they pass through the scanning field, which band areas extend parallel to the conveyor 87 on which the object is travelling and are spaced apart so as to provide signals indicative of the shapes of objects passing the scanning station. Automatic deflection control circuits for the beam of the scanner 130 are operable to cause the beam thereof to scan the surface of each object a number of times, each along paths at different predetermined heights above the conveyor 87. The respective video signals generated during each scanning are digitized and the binary digital codes generated are representative of the object's dimensions scanned and are presented to comparator circuits containing signals presented thereto from a memory. When a match occurs in the comparator circuits, signals are generated which are representative of the object identified. These signals may be applied to code, route or otherwise affect the object or may be recorded.

In the arrangement illustrated in FIG. 9, a flying spot scanner 130 is triggered to initiate scanning an object by a signal generated by a photoelectric detection means when a light beam from a light source 121' directed at a photoelectric cell 120' positioned across the conveyor, is interrupted by the object to be scanned. A photoelectric control 122', then generates an output signal which is passed to the trigger input 131 of the flying spot scanner 130 and initiates a scanning cycle. The video signal output of scanner 130 is passed on a line 132 through a rotary stepping switch 136, or its electronic equivalent, to a series of digitizing and comparator circuits by causing such switch 136 to stop after the beam has completed a horizontal scanning sweep sufficient to permit it to completely scan the width or length of the maximum dimension of all objects scanned. The switch 136 is stepped to pass video signals to respective comparator circuits so that signals representation of the side view shpe of the object may be obtained. The horizontal scanning sweeps along article band areas BA may be provided every half inch, inch or select distances apart, such that scanning signals may be generated for all objects which may be automatically analyzed to permit the discrimination of all objects in the system and the automatic identification thereof. The switch 136 may be stopped by a solenoid operated by vertical deflection signals or signals generated by the scanner after completing a horizontal scanning sweep. The complete video signal generated by such scanning is thus passed through switch 136 to a selected of a plurality of comparator circuits 143. Notation 134 refers to a time delay relay in the output 133 of the television camera for properly delaying the operation of the solenoid for operating switch 136 if the vertical sync signal employed to control the beam to effect one horizontal sweep is also applied to operate the rotary switch to pass the video signal generated during the next sweep to the next code comparator circuit.

Each of the outputs 137 of the rotary distribution switch 136 expends to a respective chain of circuits for digitizing and comparing the code signals representative of the length of the object scanned with code recordings provided on a magnetic drum 151 which code are representatives of the dimensions of objects presented to the conveyor 87 for identification. The recordings are in binary digital form and are arranged on the drum 151 such that all those recordings which are representative of the dimensions of a particular object to be identified will be reproduced simultaneously by banks of magnetic pick-up heads 152 which are connected to respective comparators for signals generated by digitizing each of two video signals which are representative of the lengths of those portions of the object scanned. Each video signal generated during horizontal scanning is passed through a particular output of switch 136 to respective logic circuitry 138 of the type described in my U.S. Pat. No. 3,081,379 for processing such video signals and generating respective edge indicating pulses generated in scanning the leading edge and the end of the object. Such pulses are applied to respectively start and stop a digital clock or to gate the output of an analog-to-digital converter provided as part of a logic circuit 139 which generates on a plurality of outputs 140 each of which codes is representative of the length of that dimension or band area of the object scanned by the beam as it generates the video signal so digitized. The parallel code on lines 140 is passed to a relay bank 141' and held in relay storage therein to activate parallel outputs 142 thereof which extend to a code matching relay 143. The code matching relay is designed in accordance with the teachings of my application Ser. No. 225,173 and U.S. Pat. No. 3,081,379 and generates a control signal on its output 145 when a code present on its inputs 142 matches the code present on its inputs 144 generated by the magnetic drum pick-ups.

When the outputs 145 of the code matching relays 143 are all simultaneously activated, a condition which indicates that all of the dimensions derived by scanning all elements of the side view of the object match or correspond to the signals recorded on the drum which represent a similarly shaped object, a signal is generated, indicating such condition, by a logical AND circuit 146 having its plural inputs connected to said code matching relay outputs. Drum recording tracks provided along an end-recording area 151' of the drum 151 contain code signals representative of the objects to be identified. These signals are so located that they may be respectively reproduced by a bank of pick-up heads 147 when their respective dimension representing codes are present at and are being reproduced by the magnetic pick-up heads 152 which are connected to the code matching relays. Normally open switches 148 in the outputs of heads 147 prevent the passage of the codes generated by such heads to a parallel-to-series converter 149. Switch 148 is closed by the signal generated by and AND circuit 146 when all code matching relays are activated so that only the code representative of the identified object is passed to converter 149, the output of which extends to control circuitry 105' for a recording laser 100', which is located, and operative in response to said code so as to effect the recording of an identifying or routing code on the object as described. The code generated on the output of parallel-to-series converter 149 or multi-pole switch 148 may also be applied to a recorder or computer for recording purposes or for generating further signals for controlling automatic operations on or with respect to the object identified.

If objects carried through the system are so shaped that they may not easily be identified by scanning one side thereof as described above, they may be automatically scanned from one or more other directions one or more times as described. Overhead scanning may be effected by means of a second TV camera or flying spot scanner such as 150, having its television signal output connected to circuitry, such as that provided for camera or scanner 130. The single drum 151 may contain signal recordings of dimensions scanned from such other directions and may rotate at a sufficiently high speed, say 10 to 100 times per second, to permit the rapid identification of all objects even if they are moving quite rapidly on the conveyor past the scanning station.

Individual photoelectric scanning cells may also be utilized to effect automatic scanning, one for each level to be scanned, and each having its output connected to suitable digitizing and code watching circuitry of the type described, wherein movement of the objects along the conveyor is constant and provides means for generating variations in the scanning signals when the leading and trailing edges of the objects scanned pass the photoelectric cells. Such photoelectric detection signals may be applied to generate binary code signals indicative of the lengths of the various portions of the objects scanned and applied to effect code matching, as described, for identifying such objects. The code or codes generated by heads 147 may define commands for controlling reprogrammed operations on the object or work so identified when such codes are either fed directly to a machine or machines to be controlled thereby or after they are recorded on the object and and the recordings read by a transducer located at one or more machines.

A system of the type defined in FIG. 9 may be modified to permit the automatic identification and/or coding of two or more objects of the same shape, which differ in certain internal characteristics, weight or contents. For example, a weight sensing transducer may be disposed at the scanning station and operative to generate a signal which is indicative of the weight or contents of the object being scanned. Such signal may be digitize and applied to a comparator along with the signals generated by scanning one or more wall of the object as described. When a match of all signals occurs, the object is identified and the resulting code signal, generated as described, is applied to code, route, or perform computations relative to the object.

In yet another form of the system of FIG. 9, product containers of similar shape may be differentiated as to contents and identified by automatically scanning and digitizing the results of scanning a lable or printed illustration provided on a wall of the object. Selective area scanning means as provided in my U.S. Pat. No. 3,081,379 and parent application Ser. No. 254,710 may be utilized to scan and generate digital signals of indicia on a selected portion of a wall of an object wherein such signals are applied, as in FIG. 9 to suitable comparator or code matching means and compared with signals reproduced from a memory per se or in combination with signals generated in scanning certain dimensions of the object, for providing identification by matching all the codes generated with code signals reproduced from recordings derived in scanning similarly shaped or labled objects.

The same scanner or TV camera used to scan the dimensions of the wall of the object containing the indicia or lable may also be programmed and operated to scan lables or indicia to generate signals therefrom which may be compared, as described, with signals reproduced from recordings. It is also noted that a single flying spot scanner or TV camera may be employed to properly scan an object from a plurality of directions by the provision of suitable mirrors and other optical components disposed at the side of and above the conveyor at the scanning station.

In the hereinbefore described embodiments employing beam scanning of objects on a conveyor, it is assumed that suitable means are provided upstream of the scanning station for properly aligning all objects on the conveyor so that they may be properly scanned.

I claim:

1. A method of providing a recording of information on an object comprising the steps of:

predeterminately locating an object and a source of intense radiant energy with respect to each other wherein said radiant energy is generatable in the form of a pulsed radiant energy beam and whereby beam energy from said source may be caused to scan a selected area of the surface of said object defining at least one strip-like track portion of said object's surface, scanning and detecting a selected portion of the object when said selected portion is predeterminately located with respect to said source of radiant energy, and generating a control signal when such detection is made, applying said control signal to cause the reproduction of selected information signals defining a code from a memory, and utilizing said selected information signals which controlling relative movement between said beam and said object to pulse the radiant energy generated by said source and to cause pulses of said radiant energy so generated to effect radiation recording of indicia along space-separated areas of the surface stratum of the object defining a record track containing such indicia extending in the direction of relative movement between the object and the beam of said radiation directed thereat.

2. A method in accordance with claim 1 in which a selected portion of the surface of said object is coated with a radiation sensitive material and said recording is effected within said coating of radiation sensitive material.

3. A method in accordance with claim 1 wherein said indicia recorded along space-separated area above the surface of said object are recorded in the form of code recordings defining said information.

4. A method in accordance with claim 1 wherein said indicia recorded along said space-separated areas of said object are recorded in the form of digital codes.

5. A method in accordance with claim 1 wherein the radiation recording of said indicia is effected by providing variations in the topography of the surface stratum of said object.

6. A method in accordance with claim 5 wherein said variations in the topography of the surface stratum of said object are shaped by said radiant energy beam such that they are capable of being electro-optically reproduced.

7. A method in accordance with claim 1 wherein said object is a record member and said scanning is effected to record said indicia along space-separated record tracks of said record member.

8. A method in accordance with claim 1 wherein said source of radiation is operable to generate a radiation beam and said relative movement between the beam generated and said object is effected by controllably conveying said object past said source of radiation.

9. A method in accordance with claim 1 wherein the pulses of radiation provide respective variations in the topography of the surface stratum of said object along space separated areas thereof which surface stratum variations define recordings which may be photo-electrically detected by varying the reflection of incident light directed against the surface of said object containing said variations in topography.

10. A method in accordance with claim 9 wherein the pulses of radiant energy applied to said object are operable to form cavities in the surface stratum of said object which cavities define said recording of information.

11. A method in accordance with claim 9 wherein said relative movement is effected by conveying said object along a select path in a given direction and said variations in the surface topography of said object are provided along the surface of said object parallel to the direction of said select path of travel of said object.

12. A method for providing a recording on an object comprising the steps of:
predeterminately locating an object and a source of intense radiant energy with respect to each other wherein said radiant energy is generated in the form of a pulsed radiant energy beam and whereby beam energy from said source may be caused to scan a selected area of the surface of said object,
identifying said object when it is at a scanning station, and
generating a control signal when such identification is made,
applying said control signal to selectively reproduce selected information signals defining a code from a memory containing a plurality of code signal recordings, so as to effect the generation of predetermined information defined by said code, and
utilizing said selected information signals while controlling the relative movement between said object and said source of intense radiant energy to pulse said beam of radiant energy so as to cause said beam to record a plurality of spot-like areas in the surface stratum of said object and to thereby effect a pulse code recording along the portion of the surface of the object intersected by said beam.

13. A method of recording information on objects comprising:
securing a layer of a recording material on a select portion of the surface of an object on which select portion an information recording is to be effected,
relatively moving said object and a source of intense beam radiation capable of effecting a recording in said recording material secured to said object, and
when said radiation source and said object are predeterminately positioned with respect to each other, detecting such relative positioning and generating a control signal and applying said control signal to effect the reproduction of information signals from a memory and applying said information signals to intensity modulate radiation from said source so as to variably generate said radiation beam while said predetermined relative movement is effected between the beam of radiation and said object such that said radiant energy beam intersects and selectively records information along a select portion of said recording material secured to said object so as to define a predetermined recording in said recording material.

14. Apparatus for coding objects by means of radiant energy comprising:
a source of radiant energy,
means for effecting controlled relative movement between said radiant energy source and an object to be coded along a select area of said object whereby energy from said source may be caused to scan said select area,
a memory containing a plurality of information signal recordings,
means for detecting the presence of said object when it is within the scanning field of said source of radiant energy and generating a control signal, and
means for applying said control signal to control the selective reproduction of information from said memory to cause a plurality of control code signals to be reproduced therefrom,
means for applying said control code signals to control the generation of radiation from said source of intense radiant energy so as to cause said radiant energy to be generated as pulses representative of the selectively reproduced code, and
means for directing said pulses of radiant energy against said select area of said object at sufficient intensity to effect variations in the surface topography of the surface stratum of said object to define a recorded code formed in said surface stratum of said object.

15. A method for recording indicia on a surface of an object comprising:
predeterminately relative positioning a radiation beam generating means and an object to be recorded on by means of radiant energy generated by said generating means,
detecting when such predetermined relative positioning is effected between said radiation beam generating means and said object and generating a first recording cycle initiating control signal upon detecting said predetermined relative positioning,
applying said control signal to address a memory containing information recorded therein and defining different indicia to be recorded on said object and reproducing select information from said memory as coded electrical control signals,
generating a beam of recording radiation by energizing said radiation beam generating means and controlling same in a manner to cause said beam to intersect a first portion of said object and effecting relative scanning movement between said beam and said object while applying a first group of select electrical control signals derived from said memory to selectively control said radiation beam during the relative scanning movement between said beam and said object in a manner to effect the recording of first indicia on a first select portion of said object,
thereafter generating further select groups of indicia defining control signals derived from said memory in synchronization with further relative scanning movement between said radiation beam and said object and applying said further select control signals to further control said beam to cause it to effect the recording of respective additional indicia on the surface of said object so as to define at least one line of indicia extending across a band-like area of the surface of said object.

16. A method in accordance with claim 16 wherein the controlled relative movement between the beam generated by said radiation beam generating means and said object is effected by controllably deflecting said beam and controllably moving said object.

* * * * *